United States Patent [19]

Baumann

[11] 3,971,411

[45] July 27, 1976

[54] VARIABLE RESISTANCE TYPE THROTTLING TRIM

[75] Inventor: Hans D. Baumann, Manville, R.I.

[73] Assignee: Masoneilan International, Inc., Norwood, Mass.

[22] Filed: Apr. 4, 1975

[21] Appl. No.: 565,158

Related U.S. Application Data

[62] Division of Ser. No. 444,020, March 7, 1974.

[52] U.S. Cl. ..................... 137/625.3; 137/625.37; 251/127; 138/43
[51] Int. Cl.² ..................................... F16K 47/04
[58] Field of Search .................. 137/625.3, 625.37; 138/43, 46, 45 A; 251/127

[56] References Cited
UNITED STATES PATENTS

| | | | |
|---|---|---|---|
| 1,645,601 | 10/1927 | Lee | 351/127 X |
| 1,754,138 | 4/1930 | Agee | 138/43 X |
| 3,252,480 | 5/1966 | Odendahl et al. | 137/625.3 |
| 3,704,726 | 12/1972 | Lewis | 137/625.3 |
| 3,851,668 | 12/1974 | Benjamin | 137/625.3 |

FOREIGN PATENTS OR APPLICATIONS

| | | | |
|---|---|---|---|
| 1,075,011 | 4/1954 | France | 137/625.3 |
| 676,218 | 11/1964 | Italy | 137/625.3 |

*Primary Examiner*—Arnold Rosenthal
*Attorney, Agent, or Firm*—Robert A. Townsend

[57] ABSTRACT

A variable resistance type control valve throttling trim having high resistance, fluid energy absorbing passages formed and controlled between the intersection of a cylindrical valve plug slidable co-operating with a cylindrical valve seatring and wherein the number, length, area ratio and specific fluid resistance are a function of the engaged length of the cylindrical plug portion in respect to the seatring bore and wherein the fluid energy absorbing passages consist of a pattern of slots and grooves radially inwardly penetrating the cylindrical wall of said valve plug and/or radially outwardly penetrating the cylindrical inside wall of said seatring bore.

3 Claims, 11 Drawing Figures

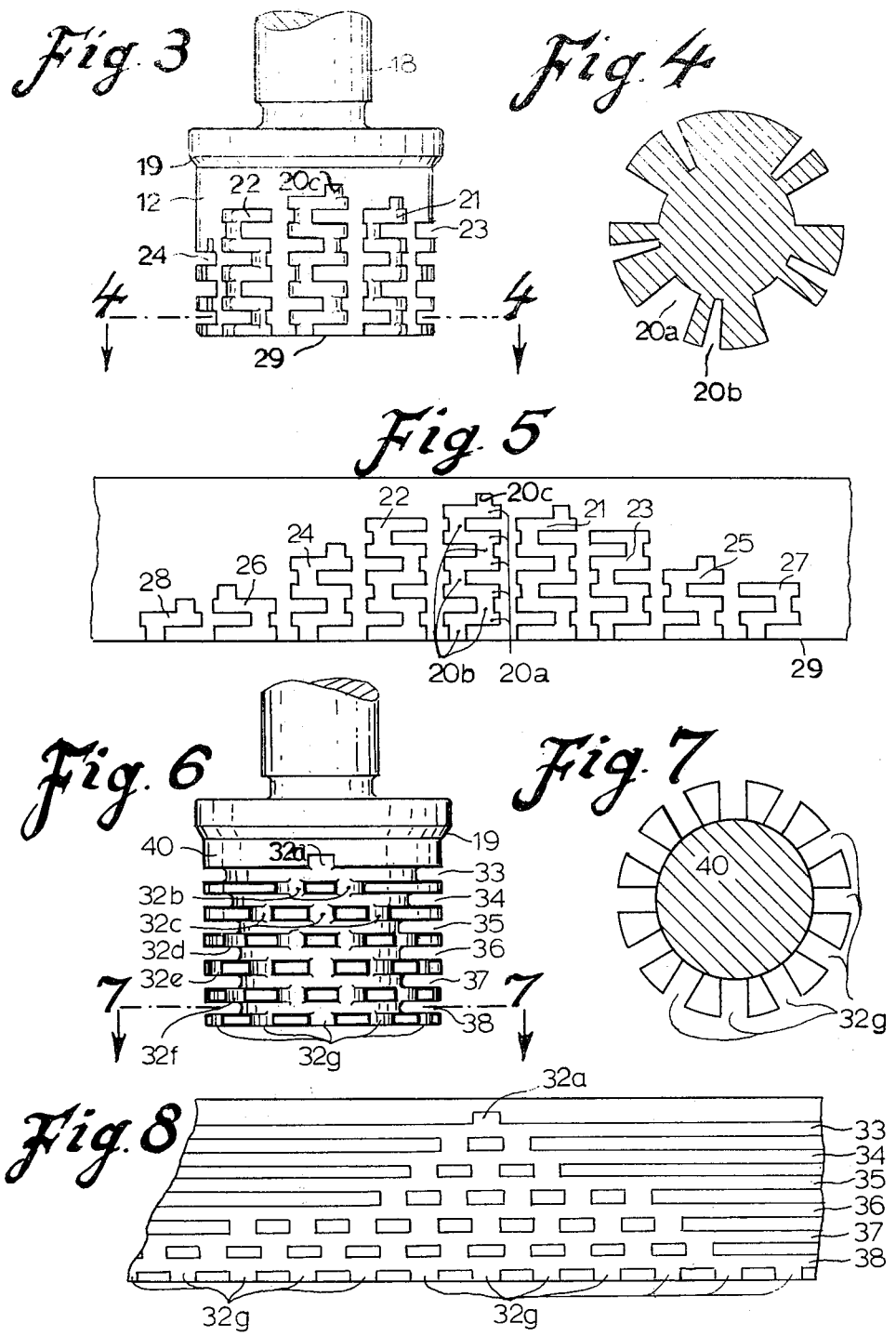

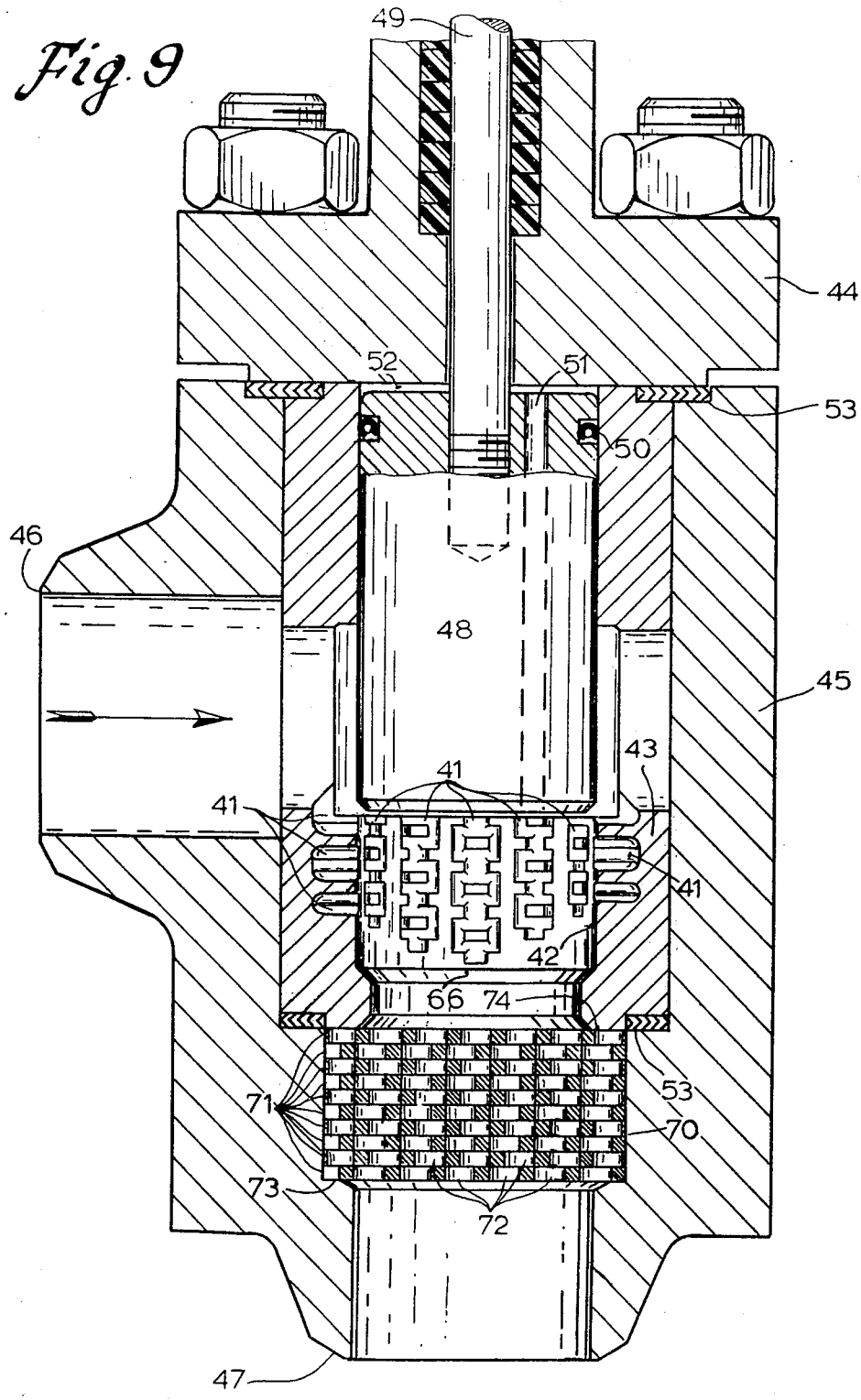

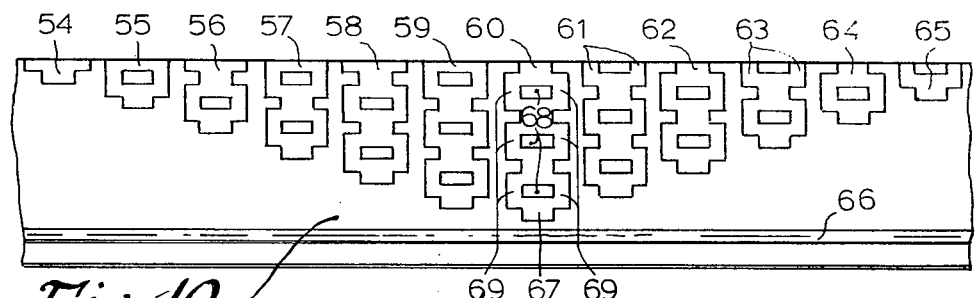
Fig. 10
Fig. 11
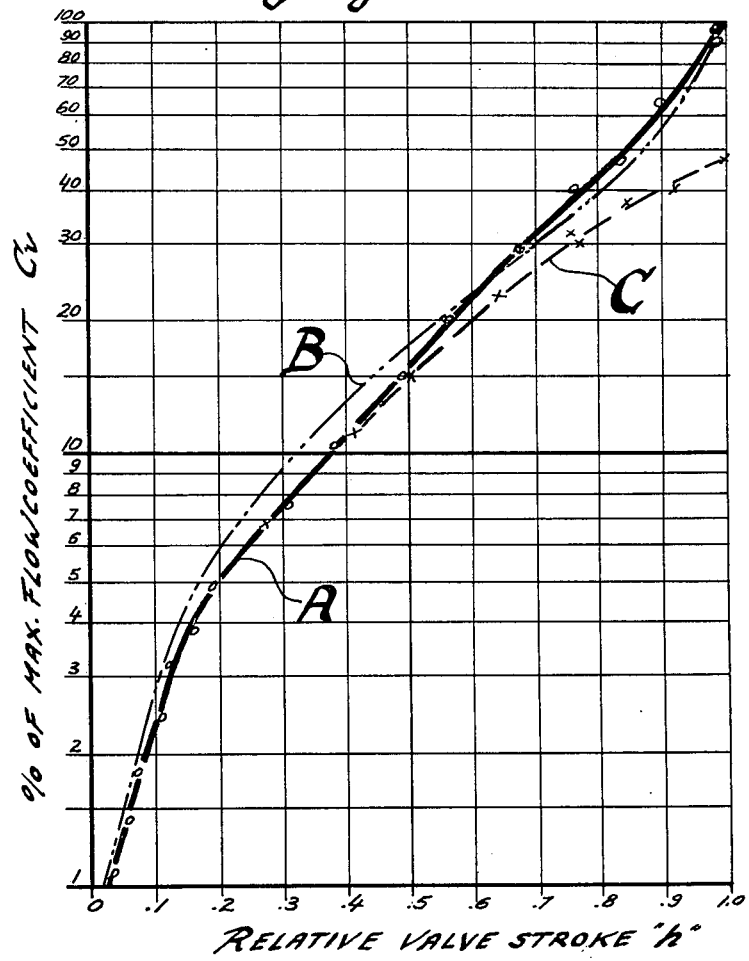

VARIABLE RESISTANCE TYPE THROTTLING TRIM

This is a division of Application, Ser. No. 444,020, filed Mar. 7, 1974

BACKGROUND OF THE INVENTION

This invention relates to a combination valve plug and valve orifice used to control flow under throttling conditions in order to regulate the level, temperature or pressure in process control applications. Conventional trim of this type usually consists of a lathe-turned plug of generally parobolic shape axially displaced in a cylindrical orifice. The annulus formed between the outer periphery of the plug and the inside diameter of the orifice provides the desired flow area at a given lift position. The relation between such a flow area at any given lift to the flow area at maximum lift determines the flow characteristic of such a trim. The combination of effective flow area and velocity headloss then defines the flow capacity usually expressed in Cv, where 1 Cv is the flow of 1 US gpm of water passing through a restriction under a pressure drop of 1 psi. From the Darcey equation:

$$Cv = \frac{38.1 \times C \times area\ (in^2)}{\sqrt{K}}$$

wherein $C$ is a contraction coefficient and $K$ is the velocity headloss coefficient.

In conventional trim systems the flow characteristic can only be determined through variations in flow area (requiring a precision machining of the valve plug), since the velocity headloss coefficient, i.e. the fluid resistance, is for all practical purposes constant (usually $K \cong 0.7$). Furthermore, the relatively smooth flow path between a parablolic plug and an orifice can lead to pressure recovery and therefore cavitation on liquids. In addition, most process control systems require that the pressure drop across the valve should rise inverse proportional to the square of the decrease in flow rate (i.e. at 25% flow the pressure drop can be 16 times higher than that at 100% flow), due to pump droop and line resistance in series with the valve requiring a flow characteristic commonly called "equal percentage" to compensate for the non-linearity of pressure drop. Again, the accuracy of such a characteristic depends on the precision machining of a complex curvature on the valve plug. The high differential pressure $\Delta p$ at low flow rates produces excessive fluid velocities (due to the relatively low velocity headloss coefficient $K$, since $V = f(\Delta p/K)^{1/2}$. High velocities cause erosion of the trim with liquids and substantial aerodynamic noise with gases (Sound Pressure Level $SPL = f(V)^8$).

SUMMARY OF THE INVENTION AND DESCRIPTION OF PRIOR ART

The present invention overcomes all these objections and difficulties associated with the prior art. In its configuration suggested for liquid media, the flow characteristic is a function of both, a variable flow area and an inverse variable velocity headloss coefficient $K$. The result is a plug which does not require a precision contour but in addition provides for an increase in internal fluid resistance with decrease in flow, i.e. increase in pressure drop across the valve, thus assuring a nearly constant throttling volocity with absence of erosion and noise.

My invention provides for a number of restrictions in series to achieve a high $K$ factor as part of a number of flow paths parallel to the plug axis and formed typically between slots in the periphery of the plug and the smooth inside bore of a seatring whose number of flow paths and their specific resistance are variedly engaged depending on the particular valve stroke.

None such advantages are found in other prior art patents such as Self U.S. Pat. Nos. 3,514,074 and 3,513,864, or Cummins U.S. Pat No. 3,529,628. Such prior art trims do provide a high velocity headloss coefficient K through the use of labyrinthyne flow passages (repeated velocity reducing changes in direction) between stacked washers with the flow passing essentially perpendicular to the plug axis. All stacks are uniform, resulting in a linear increase in flow area and a linear flow characteristic resulting again in substantially higher flow velocities at low flow rates. Furthermore, all of the pressure drop across the labyrinthyne flow passages occurs at the same time across the leading tip of the solid cylindrical valve plug (since the next stacked opening — not yet exposed by the plug — is at the low downstream pressure level) leading to substantial wear at this point. My invention, on the other hand, exposes such "leakage flow" to a prolonged channel of a narrow gap formed between the plug and cylinder and where leakage flow is continually disrupted (and interrupted) by successive slots or grooves not yet exposed, i.e. the leakage flow passes through the normal restrictions in series.

Another disadvantage found with said prior art inventions is the fact that each set of flow paths constituted by a set of perforated plates, as in Self U.S. Pat. No. 3,513,864, is separated in the vertical direction by a solid wall producing a discreet pause in the rate of flow increase detrimental for automatic control purposes.

Yet, another advantage of my invention is a substantial economic benefit. The prior art patents mentioned above require relatively large pressure vessels to house the cylindrical disk, while in my invention the trim size is nearly identical to that of conventional parabolic trim. For example, a 2 inch plug dia. of my invention has a maximum Cv of 30. A stacked disk type valve with identical capacity requires a valve bonnet opening of about 4 inch to accomodate such a trim. The weight (and directly related to the cost) difference between a 2 and 4 inch bonnet flange is about 1 to 3.

In case a high pressure drop independent of flow rate is required (such as for boiler feed water recirculating valves), then my invention can accomodate a fixed restriction in series with — but independent of — the movable valve trim, as described in the following detailed description. Such a fixed restriction absorbing more than 75% of the pressure drop at maximum flow shifts the burden away from the movable valve plug and results again in a substantial cost benefit and savings in valve operator power.

Yet, still another advantage lies in the fact that the plug (or seat) of my invention is cleanable, that is, the slots forming the flow passages and orifice type restrictions in series are easily accessible, once plug and seatring are separated. Such cleaning is not possible with stacked disc type valves, due to the fact that the discs are welded or brazed together, in order to maintain their required geometry.

Finally, my invention assures a wider rangeability between minimum and maximum controllable flow (due to the combined variation of both, K factor and flow area) than any conventional prior art trim, thus allowing substantial energy savings in liquid pumping systems, since very low valve pressure drop can be tolerated at the wide open valve position without distortion in the overall control valve gain.*

*See: H. D. Baumann on: "How to Assign Pressure Drop Across Control Valves for Liquid Pumping Systems" Proceedings of the Texas A & M Symposium Jan. 1974.

In an alternate arrangement of my invention suggested for gas service, the individual flow paths are inter-connected, in order to provide for a rapidly increasing flow area with successive increase in restrictions across the flow path, in order to accommodate for increase in volume following a reduction in pressure. This assures low trim outlet velocities with resultant low Aerodynamic Noise Levels, thereby effectively combatting noise pollution problems.

Further economics are derived from combining essential axial flow passages located on the outer periphery of a plug with those located at the inner bore of the seatring leading to still higher flow capacities per given size without sacrifice in either resistance value or flow characteristic.

These and other objects, features and advantages of the present invention will be readily apparent from the following detailed description taken in conjunction with the accompanying drawings, in which:

FIG. 3 is an external view of a throttling valve plug of my invention as preferred for liquid throttling service.

FIG. 4 is a horizontal sectional view of the cylindrical portion of the variable resistance type throttling valve plug shown in FIG. 3.

FIG. 5 is a complete development of the external circumference of the cylindrical portion of the throttling plug shown in one preferred embodiment for liquid service in FIG. 3.

FIG. 6 is an external view of a variable resistance type throttling valve plug of my invention as preferred for gaseous throttling service.

FIG. 7 is a horizontal sectional view of the cylindrical portion of the throttling valve plug as shown in FIG. 6.

FIG. 8 is a complete development of the external circumference of the cylindrical portion of the throttling plug shown in one preferred embodiment for gaseous service in FIG. 6.

FIG. 9 is a vertical sectional view of a high pressure angle valve as may be used for boiler feed water recirculation service incorporating a fixed fluid resistance element in series with a variable resistance type valve throttling trim of my invention, consisting of a radially grooved seatring cooperating with a solid cylindrical valve plug (shown in the fully open position).

FIG. 10 shows a complete development of the grooved circumference of the inner bore of said variable resistance type seatring of FIG. 9.

FIG. 11 constitutes a graphical display of the inherent flow characteristic, i.e. the flow coefficients v.s. the relative valve stroke, of my invention when measured with and without the use of a fixed fluid resistance element in series with the variable resistance type valve throttling trim.

DESCRIPTION OF THE PREFERRED EMBODIMENT

Figure 2:
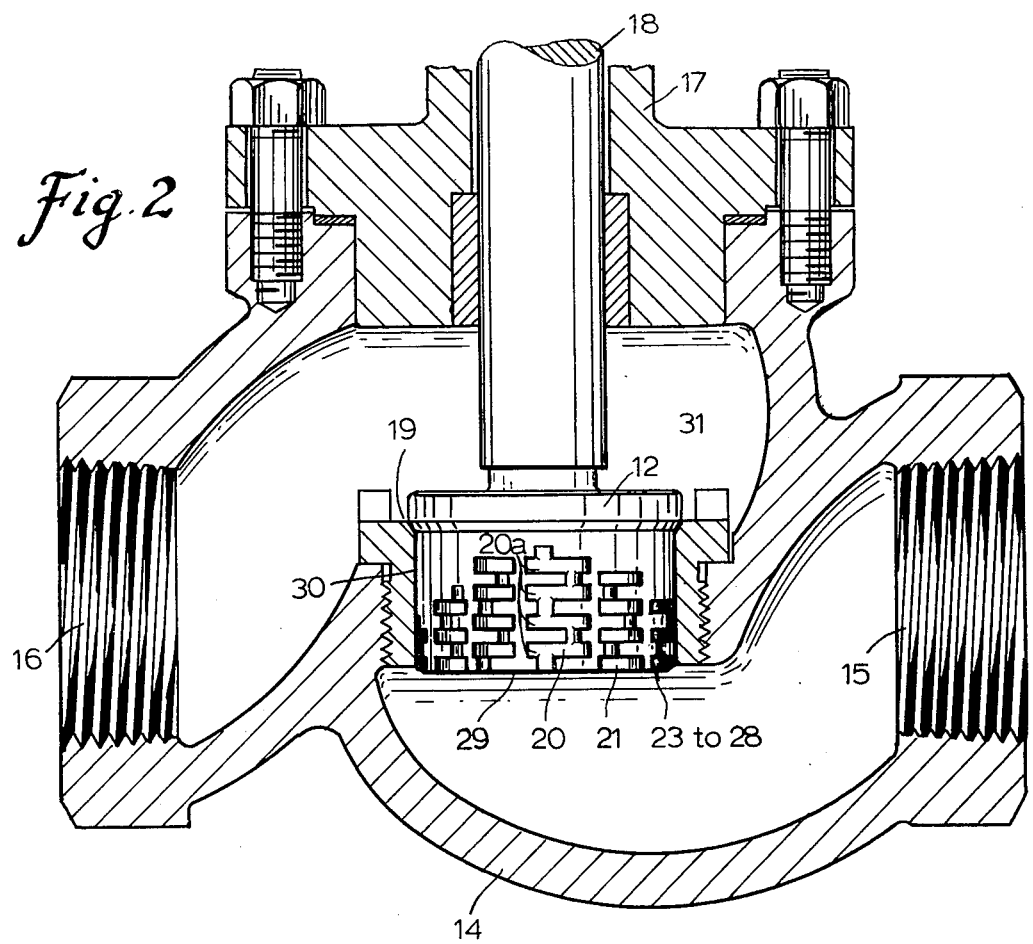
FIG. 2 is a vertical sectional view of a preferred embodiment of my invention as part of a complete valve assembly with the grooved throttling plug shown in the closed position.

Referring to FIG. 2, there is shown a preferred form of my invention suitable for liquid throttling service embodied in a grooved valve plug 12, slideable arranged within a cylindrical valve seatring 13. The latter is part of a conventional valve housing 14, having an inlet port 15 and an outlet port 16 respectively. A valve bonnet 17 provides access means for the removal of said valve plug 12 and seatring 13 and in addition provides mounting means for valve actuating devices of well known and conventional construction, such as pneumatic diaphragm actuators which, in turn, provide reciprocating motion for valve plug 12 by means of a valve stem 18 in response to a command signal from a controlling instrument. In the closed position (as shown), a seating surface 19, being part of plug 12, mates with a similar surface of seatring 13 and, therefore, provides for tight closure of the valve. A number of integrally precision cast or otherwise formed grooves 20 to 28 are located around and penetrating the periphery of the cylindrical portion of plug 12, each consisting of evenly distributed horizontal layers 20a, communicating with each other through vertical restrictive openings 20b alternately off-set horizontally, as shown more closely in FIG. 5. Each of the grooves located adjacent to groove 20 has successive lesser numbers of horizontal layers and respective vertical restrictive openings, i.e. becomes shorter in length when viewed from the terminating tip 29 of plug 12.

Referring to FIG. 2, it can be seen that each of the grooves 20 to 28 are, in effect, fluid conduits enclosed between walls, provided in two planes by the plug material itself and in the third plane by the inner wall 30 of seatring 13. In the closed valve position, all grooved fluid conduits 20 to 28 are open to fluid passing through inlet port 15. However, each of these conduits are closed off in the vertical direction by terminating walls such as 20c, hence no fluid flow can occur until upward motion of plug 12 causes each successive groove to disengage from the cyclindrical wall 30 and in effect, provide for a discharge of fluid into chamber 31 of valve housing 14.

A gradual upward movement of plug 12 will first expose groove 20, then groove 21, next 22, and so on until all grooves 20 to 28 are able to discharge fluid at maximum valve stroke $h$. It should be noted that with each successive exposure of a new groove, the effective number of vertical restrictions 20b still contained in that portion of the groove covered by seatring wall 30 decreases in direct proportion to the relative valve stroke $h$. Said vertical restrictions provide for successive layers of pressure reducing obstacles to the fluid flow within the boundaries of said fluid conduits. Each of the vertical restrictions has a velocity headloss coefficient $k$ of 1, where $k = \Delta p\, 2g/v^2$ from the well known fluid mechanic relationship. Designating $K$ as the total sum of $k$ values contained in the longest groove 20, and designating A as the total vertical cross-sectional area in in$^2$ of all fluid conduits, one can now calculate the flow coefficient $Cv$ for each relative valve stroke position $h$ as follows:

$$Cv = \frac{38.1\, A\, h\, C}{\sqrt{K(1-h)}}$$

Note: The term $\sqrt{K(1-h)}$ should be limited to 0.7 as a minimum value, since there are at least some minimal turbulent pressure losses in the body section, even with all grooves exposed.

$C$ is a contraction coefficient = 0.8.

It should be noted, that the horizontal grooves 20 to 28 could just as well provide the pressure reducing restrictions with small change in their geometric relationship to the vertical slots shown.

Figure 1:
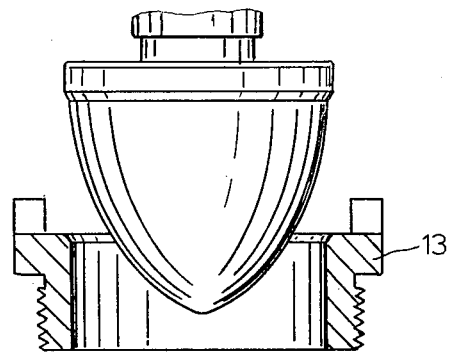
FIG. 1 is a vertical partly sectional view of a throttling trim representing conventional prior art.

The most unique effect of my invention is now that with each increase in flow area (addition of one groove), there is a corresponding decrease in fluid resistance (decrease in K, due to omission of one restriction for each of the exposed grooves). As demonstrated by the above equation and illustration in FIG. 11 (Curve A), the result is a truly exponential flow characteristic, superior to those obtainable with conventional lathe turned plugs (see FIG. 1). In fact, the obtained characteristic comes vary close to the ideal characteristic desired to produce a constant control valve gain in control applications, where the valve in the wide open position should reduce little of the total pressure head produced by a pump (in order to conserve pump horsepower).

The desired ideal characteristic for such service is calculated as follows:

$$\frac{C_v}{C_{v\,max}} = \frac{h\sqrt{Y}}{\sqrt{1+(Y-1)h^2}}$$

where $Y$ is the ratio of the pressure drop across the valve wide open to the pressure drop experienced near the closed valve position.

Curve B in FIG. 11 demonstrates such a characteristic for a $Y$ ratio of 0.10, i.e. a valve pressure drop at rated flow of only 10% of all the pressure drop generated by line friction and drop in pump head. No commercially available valve has such a characteristic. Yet, my invention provides such an ideal shape of the flow curve.

Another embodiment of my invention more suitable for throttling of compressible media is shown in FIGS. 6, 7 and 8. Here the fluid conduits, penetrating the outer circumference of a cylindrical plug 40, are all interconnected with each other through vertical slots 32 connecting a series of parallel horizontal grooves 33 to 38. Valve plug 40 functions in the identical manner when interchanged with plug 12 in the valve structure and cylindrical seatring shown in FIG. 2. After disengagement from valve seatring surface 19, continued up-stroke of valve plug 40 will first expose single slot 32a, then two slots 32b, followed by three slots 32c, and so on until, at maximum valve stroke $h$, all 12 illustrated vertical slots 32g are opened to fluid flow through disengagement from the inner seatring wall 30. Note, that in this case compressible media such as gas or steam enters valve housing 14 at port 16, i.e. the flow direction is reversed from that recommended for the liquid embodiment. At partial valve stroke (i.e. highest differential pressure) only a small number of vertical slots 32 are exposed to the media to enter. However, an additional multitude of slots 32 and horizontal grooves 33 to 38 do provide gradual expanding and additional pressure loss producing fluid conduits between the unexposed cylindrical portion of plug 40 and the cylindrical seatring wall 30. Each time the passing gas looses some of its pressure by expanding from a slot 32 into a horizontal groove 33 to 38, it expands in volume. However, since the next following groove in the downstream direction does have an even greater number of vertical slots 32, it compensates for this change in volume, thereby assuring a nearly constant throttling velocity (ideally less than sonic, in order to reduce the aerodynamic throttling noise level which varies to the 8th power of subsonic velocity*). Typically, with increase in flow, the pressure drop and therefore the volume modifying ratio $P_1/P_2$ decreases, particularly if additional fixed downstream restrictions (see FIG. 9) are employed. By invention automatically compensates for this by continually decreasing the ratio between the exposed vertical slots and the number of successive un-exposed slots with increase in valve stroke. For example, at the beginning of the valve stroke only one vertical slot 32a allows fluid to enter. Yet, the final exit for this fluid is through 12 slots 32g in the configuration selected for FIGS. 6 to 8, allowing for a total volume change i.e. ratio between absolute inlet to outlet pressure ($P_1/P_2$) of 12 to 1.

* See H. D. Baumann "On the Prediction of Aerodynamically Created Sound Pressure Level of Control Valves", ASME Paper Wa/Fe - 28, 1970

Near the wide open position (in the next to the last stage) gaseous fluid enters through 10 slots 32f and exits through 12 slots 32g i.e. providing only for a pressure ratio of 1.2 to 1. Additional variations in flow area can be achieved by varying the depth of a horizontal groove in respect to the next groove, as illustrated in FIG. 6 where groove 33 is shallower than grooves 34 and 35.

In the preferred embodiment of my invention for gaseous service, an increase of flow area with valve stroke is coupled with a simultaneous decrease in expanding area ratio and number of velocity headloss (K) producing fluid restrictions, resulting in an essentially logarithmic flow characteristic. However, it should be understood that, while this preferred embodiment will suit most typical process control conditions, my invention is not necessarily limited to this particular configuration. For example, plug 40 or for that matter plug 12 could be produced with a nearly constant number of vertical slots and groove sets thereby providing for a linear characteristic. Another variation in design would be to arrange said horizontal grooves in a spiral pattern or in a slightly tilted angle in respect to the horizontal plug axis, in order to achieve a more gradual exposure to fluid flow at the point of extraction from the seatring, without departing from the spirit of my invention or from the scope of the attached claims.

Yet, another embodiment of my invention is shown in FIG. 9. Here the aforementioned fluid conduits are formed by precision cast grooves 41 penetrating radially outwardly from the inner cylindrical wall 42 of a seatring 43. The latter being retained by a bonnet closure 44 in a valve housing 45 having welded inlet 46 and outlet 47 connections. A cylindrical valve plug 48 is slidingly engaged within seatring 43 being connected to a valve actuating device of conventional construction (not shown) by a valve stem 49. The upper portion of plug 48 contains slidable seals 50 providing means of static pressure balance in conjunction with a communicating bore 51 providing access of fluid to cavity 52.

Spirotallic gaskets 53 seal the process fluid and prevent leakage.

In the shown maximum stroke position, all grooves 54 to 65 (see also FIG. 10) are uncovered by valve plug 48 and therefore open to the passing fluid. However, with decrease in stroke, i.e. valve plug 48 approaching seating surface 66, progressive layers of grooves are covered by the plug and therefore unaccessible to the fluid in identical manner as described previously.

The grooved seatring in FIGS. 9 and 10 is shown in an alternate configuration preferred for liquid throttling service, but can just as well be built utilizing the pattern of grooves shown in FIGS. 2, 3, 4, and 5 or the gas flow pattern of FIGS. 6, 7, and 8. The aforementioned alternate pattern consists of an alternating arrangement of horizontal grooves 67 (see FIG. 10) separated periodically by horizontal bars 68 and small vertical grooves 69, providing a restrictive by-pass for the fluid travelling in the generally vertical direction along the seatring axis.

As an added element, the valve configuration of FIG. 9, which is especially suitable for boiler feedwater recirculation service of several thousand psi pressure drop, has a fixed downstream resistance element capable of absorbing the bulk of the throttling energy being converted in the valve near maximum flow rates.

As illustrated herein, the fixed resistance element 70 consists of a number of stacked plates 71, each incorporating a pattern of perforated holes 72. All plates are stacked in pairs, so that one half of each hole 72 overlaps the opposite half of the corresponding hole of the adjacent stacked plate, thereby providing a continuous torturous flow path for the passing liquid. The complete assembled resistance element rests on an embutment 73 of valve housing 45 being compressed and held in place by a lower ridge 74 of seatring 43. Being a fixed resistance element, the pressure drop across it will vary with the square of the flow rate, i.e. if the pressure drop across the element 71 is 76% of the total valve pressure drop at maximum flow (as shown in graph FIG. 11 curve C), then the pressure drop is only 19% at half the rated flow. Consequently, the pressure drop across the variable resistance type valve throttling trim 43 and 48 will vary from 24% wide open to 81% at 50% rated flow. This is exactly the desired characteristic of my invention, i.e. it gives economic benefit by providing high resistance (capability of absorbing high pressure drop) only when the demand for flow (needed flow area) is low, since it is much more economical to absorb the maximum energy change with a relatively inexpensive produceable fixed resistance device of known and prior art. The resultant overall flow characteristic shown as curve C in FIG. 11 approaches a linear relationship between valve stroke $h$ and flow coefficient $C_v$ as actually desired for feedwater recirculation service where the valve is subjected to a nearly constant pump output pressure regardless of stroke position.

Finally, a combination of a seatring having outwardly penetrating fluid conducting grooves and slots such as shown in FIGS. 9 and 10 can cooperate with a plug having radially inwardly penetrating grooves and slots, as shown in FIGS. 2, 3, 4, 5 or FIGS. 6, 7 and 8 for increased flow capacity without adverse effects on the desired flow characteristic or ability to absorb high pressure drop.

While particular embodiments of the present invention have been herein illustrated and described, it is not intended to limit the invention to such disclosures but changes and modifications may be made herein and thereto within the scope of the following claims.

I claim:

1. Variable resistance type valve throttling element comprising:
   a. a seatring having therewithin a continuous cylindrical bore, said seatring further having annular, non-cylindrical, inner wall surfaces at the opposite ends; of and terminating said continuous cylindrical bore;
   b. a cylindrical valve plug reciprocatingly and slidingly engaged within said cylindrical bore of the seatring, and having an outer cylindrical wall surface;
   c. a number of throttling flow channels penetrating radially outward from said continuous cylindrical bore of the seatring, at least one said penetrating channel commencing near one said continuous bore terminating surface of said seatring, and all said channels terminating within said other continuous bore terminating surface of said seatring, the non-cylindrical extent of said other continuous bore terminating surface being radially outward from said continuous cylindrical seatring bore whereby said other terminating surface is not covered by the engaging of said cylindrical valve plug within said cylindrical seatring bore, said channels-terminating thereby establishing a number of openings within said other continuous bore terminating surface of said seatring to provide access for fluid in direction of the longitudinal plug axis, said channels adapted to be covered along their longitudinal axis by the outer cylindrical wall surface of the reciprocating plug, while said plug is slidingly engaged within the seatring bore, and said channels comprising one or more penetrating grooves extending circularly at least part way around the interface between the reciprocating plug and said seatring bore; each groove provided with one or more communicating vertical passageways to the next groove, and said vertical passageways alternatively off-set to each other in the direction along the circumference of the seatring bore.

2. A variable resistance type valve throttling element as described in claim 1, wherein the length of the effective fluid conducting channels, which are covered, and hence the amount of resistance offered to fluid flow is determined by the portion of said cylindrical valve plug which is engaged within said seatring bore.

3. A variable resistance type valve throttling element as described in claim 1, wherein the overall length of each flow channel is successively shortened to provide sequential exposure to fluid flow where the cylindrical wall surface of said plug disengages from the seatring bore.

* * * * *